United States Patent
Zinck et al.

(10) Patent No.: US 11,365,718 B2
(45) Date of Patent: Jun. 21, 2022

(54) ADAPTIVE ESTIMATION OF AVAILABLE POWER FOR WIND TURBINE

(71) Applicant: VESTAS WIND SYSTEMS A/S, Aarhus N (DK)

(72) Inventors: Kasper Zinck, Flemming (DK); Martin Ansbjerg Kjær, Harlev J (DK); Jesper Sandberg Thomsen, Hadsten (DK); Jacob Deleuran Grunnet, Tranbjerg J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 252 days.

(21) Appl. No.: 16/619,691

(22) PCT Filed: May 30, 2018

(86) PCT No.: PCT/DK2018/050120
§ 371 (c)(1),
(2) Date: Dec. 5, 2019

(87) PCT Pub. No.: WO2018/224103
PCT Pub. Date: Dec. 13, 2018

(65) Prior Publication Data
US 2020/0200145 A1 Jun. 25, 2020

(30) Foreign Application Priority Data
Jun. 7, 2017 (DK) .............................. PA201770445

(51) Int. Cl.
*F03D 7/02* (2006.01)
*F03D 7/04* (2006.01)
(Continued)

(52) U.S. Cl.
CPC ............ *F03D 7/0284* (2013.01); *F03D 7/042* (2013.01); *H02J 3/004* (2020.01); *H02J 3/10* (2013.01);
(Continued)

(58) Field of Classification Search
CPC ........ F03D 7/0284; F03D 7/042; F03D 7/046; F03D 7/028; H02J 3/004; H02J 3/10;
(Continued)

(56) References Cited

U.S. PATENT DOCUMENTS

2004/0024937 A1* 2/2004 Duncan ................. H02M 7/003
710/100
2010/0066087 A1 3/2010 Hayashi et al.
(Continued)

FOREIGN PATENT DOCUMENTS

| CN | 104632521 A | 5/2015 |
| CN | 104675629 A | 6/2015 |

(Continued)

OTHER PUBLICATIONS

Chinese Office Action for Application No. 201880047654.6 dated Sep. 1, 2020.
(Continued)

*Primary Examiner* — Ziaul Karim
(74) *Attorney, Agent, or Firm* — Patterson + Sheridan, LLP

(57) ABSTRACT

Embodiments are generally directed to techniques for operating a wind turbine of a wind power plant. An associated method comprises determining, using one or more sensors of the wind turbine, a first power production level of the wind turbine; determining, during an unconstrained operation of the wind turbine, one or more available power correction factors using the first power production level; determining, using one or more wind power parameters (Continued)

applied to a predefined model for estimating an available power of the wind turbine, an estimated available power value; adjusting the estimated available power value using the one or more available power correction factors to produce the available power value; and controlling, using the available power value, the wind turbine to produce a second power production level.

20 Claims, 6 Drawing Sheets

(51) Int. Cl.
 *H02J 3/00* (2006.01)
 *H02J 3/10* (2006.01)
 *H02J 3/18* (2006.01)
(52) U.S. Cl.
 CPC ......... *H02J 3/1885* (2013.01); *H02J 2203/10* (2020.01); *H02J 2300/28* (2020.01); *H02J 2310/58* (2020.01)
(58) Field of Classification Search
 CPC .. H02J 3/1885; H02J 2203/10; H02J 2300/28; H02J 2310/58; F05B 2260/84; F05B 2270/335; Y02E 10/72
 See application file for complete search history.

(56) References Cited

U.S. PATENT DOCUMENTS

| | | |
|---|---|---|
| 2011/0118892 A1 | 5/2011 | Mayor et al. |
| 2011/0224926 A1 | 9/2011 | Morjaria et al. |
| 2012/0139247 A1 | 6/2012 | Krueger |
| 2013/0221676 A1* | 8/2013 | Caldwell ................ F03D 15/00 290/55 |
| 2014/0186177 A1 | 7/2014 | Bohme et al. |
| 2015/0097373 A1* | 4/2015 | Esbensen ................ F03D 7/00 290/44 |
| 2015/0219074 A1 | 8/2015 | Babazadeh et al. |
| 2015/0249415 A1* | 9/2015 | Babazadeh ............... H02J 3/50 290/44 |
| 2015/0275862 A1* | 10/2015 | Babazadeh ............... H02J 3/46 290/44 |

FOREIGN PATENT DOCUMENTS

| | | |
|---|---|---|
| EP | 2860395 A1 | 4/2015 |
| JP | 2005163608 A | 6/2005 |
| JP | 2013231381 A | 11/2013 |
| WO | 2010139372 A1 | 12/2010 |
| WO | 2014046355 A1 | 3/2014 |
| WO | 2018224103 A1 | 12/2018 |

OTHER PUBLICATIONS

PCT International Search Report for Application No. PCT/DK2018/050120 dated Jun. 8, 2018.
Tuhfe Gbcmen et al: "Possible Power Estimation of Down-Regulated Offshore Wind Power Plants", Dec. 31, 2015 (Dec. 31, 2015), p. 35.
PCT Written Opinion of the International Searching Authority for Application No. PCT/DK2018/050120 dated Jun. 8, 2018.
Danish Patent and Trademark Office, 1st Technical Examination Including The Search Report and Search Opinion for Application PA 2017 70445 dated Nov. 2, 2017.
Intellectual Property India, First Examination Report for Application 201917050346 dated Jan. 31, 2022.

\* cited by examiner

ADAPTIVE ESTIMATION OF AVAILABLE POWER FOR WIND TURBINE

BACKGROUND

Field of the Disclosure

Embodiments presented in this disclosure generally relate to techniques for controlling wind turbine power production using adaptively estimated available power values.

Description of the Related Art

Modern power generation and distribution networks increasingly rely on renewable energy sources, such as wind turbines. In some cases, the wind turbines may be substituted for conventional, fossil fuel-based generators. However, operational conditions of the wind turbine generators as well as natural variations in wind conditions can affect the ability of wind turbines to predictably deliver power. Additionally, wind conditions may at times be unsuitable for generating power.

Independent of the power that is being generated by a wind turbine at a particular time, a wind turbine may be required to provide a signal that indicates how much power it is capable of producing. This signal may be referred to as the "available power" for the wind turbine under the current wind conditions (or $P_{av}$), and may be used by a system operator to control the power balance for a connected electrical grid. The grid codes in some locations may be relatively strict, requiring that the available power signal be very accurate. An inability of the wind turbine to provide an available power signal having the desired accuracy typically results in the wind turbine being deemed "non-compliant" and therefore not suitable for use in the location, which means that a potential market for the wind turbine is lost.

Under unconstrained operation, a wind turbine may typically produce as much power as it can, such that the available power is substantially equal to the actual power production. In this way, values of the available power may be determined using actual power measurements. However, it can be difficult to determine an available power signal during constrained operation of the wind turbine. For example, when commanded to reduce its power production, no direct measurement of the available power is available, so that the available power must be estimated.

One possible technique for producing the available power signal is to measure the wind speed at the wind turbine and to access values from a predefined look-up table with a power curve. However, the power production of the wind turbine generally depends on factors in addition to the wind speed, such as wind share, wind turbulence, air density, the conditions of the wind turbine blades (e.g., whether dirt or ice is on the blades, whether the blades are misaligned, etc.), internal power consumption of the wind turbine, and so forth. Further, it may be difficult to acquire exact wind speed measurements, so that in some cases the power production of the wind turbine is estimated using, e.g., a look-up table.

SUMMARY

One embodiment of the present disclosure is a method for operating a wind turbine. The method comprises determining, using one or more sensors of the wind turbine, a first power production level of the wind turbine; determining, during an unconstrained operation of the wind turbine, one or more available power correction factors using the first power production level; determining, using one or more wind power parameters applied to a predefined model for estimating an available power of the wind turbine, an estimated available power value; adjusting the estimated available power value using the one or more available power correction factors to produce the available power value; and controlling, using the available power value, the wind turbine to produce a second power production level.

The method advantageously allows improved accuracy for available power calculations of a wind turbine. In some cases, the available power correction factors may be adaptively updated, such that errors arising in the model-based estimated available power values (due to changing conditions, constrained operation, etc.) may be mitigated. More accurate available power calculations may enable the wind turbine to produce additional power during periods of constrained operation, e.g., without needlessly curbing power delivery. More accurate available power calculations may further enable the wind turbine to meet stringent grid code requirements. Each of these generally supports an increased revenue generation for operation of the wind turbine.

Another embodiment of the present disclosure is a wind turbine comprising a generator configured to produce electrical power; one or more sensors; and a control arrangement comprising one or more computer processors that are communicatively coupled with the generator. The control arrangement is configured to: determine, using the one or more sensors, a first power production level of the wind turbine; determine, during an unconstrained operation of the wind turbine, one or more available power correction factors using the first power production level; determine, using one or more wind power parameters applied to a predefined model for estimating an available power of the wind turbine, an estimated available power value; adjust the estimated available power value using the one or more available power correction factors to produce the available power value; and transmit, using the available power value, control signals to the generator such that the wind turbine produces a second power production level.

The wind turbine advantageously allows improved accuracy for available power calculations. In some cases, the available power correction factors may be adaptively updated, such that errors arising in the model-based estimated available power values (due to changing conditions, constrained operation, etc.) may be mitigated. More accurate available power calculations may enable the wind turbine to produce additional power during periods of constrained operation, e.g., without needlessly curbing power delivery. More accurate available power calculations may further enable the wind turbine to meet stringent grid code requirements. Each of these generally supports an increased revenue generation for operation of the wind turbine.

Another embodiment of the present disclosure is a control arrangement for a wind turbine. The control arrangement comprises one or more computer processors that are configured to: measure, using one or more sensors of the wind turbine, a first power production level of the wind turbine; determine, during an unconstrained operation of the wind turbine, one or more available power correction factors using the measured first power production level; determine, using one or more wind power parameters applied to a predefined model for estimating an available power of the wind turbine, an estimated available power value; adjust the estimated available power value using the one or more available power correction factors to produce the available power value; and control, using the available power value, the wind turbine to produce a second power production level.

The control arrangement advantageously allows improved accuracy for available power calculations of a wind turbine. In some cases, the available power correction factors may be adaptively updated, such that errors arising in the model-based estimated available power values (due to changing conditions, constrained operation, etc.) may be mitigated. More accurate available power calculations may enable the wind turbine to produce additional power during periods of constrained operation, e.g., without needlessly curbing power delivery. More accurate available power calculations may further enable the wind turbine to meet stringent grid code requirements. Each of these generally supports an increased revenue generation for operation of the wind turbine.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments are generally directed to techniques for operating a wind turbine of a wind power plant. An associated method comprises determining, using one or more sensors of the wind turbine, a first power production level of the wind turbine; determining, during an unconstrained operation of the wind turbine, one or more available power correction factors using the first power production level; determining, using one or more wind power parameters applied to a predefined model for estimating an available power of the wind turbine, an estimated available power value; adjusting the estimated available power value using the one or more available power correction factors to produce the available power value; and controlling, using the available power value, the wind turbine to produce a second power production level.

The techniques described herein advantageously allow improved accuracy for the available power calculations of the wind turbine. In some cases, the available power correction factors may be adaptively updated, such that errors arising in the model-based estimated available power values (due to changing conditions, constrained operation, etc.) may be mitigated. More accurate available power calculations may enable the wind turbine to produce additional power during periods of constrained operation, e.g., without needlessly curbing power delivery. More accurate available power calculations may further enable the wind turbine to meet stringent grid code requirements. Each of these generally supports an increased revenue generation for operation of the wind turbine.

Figure 1:
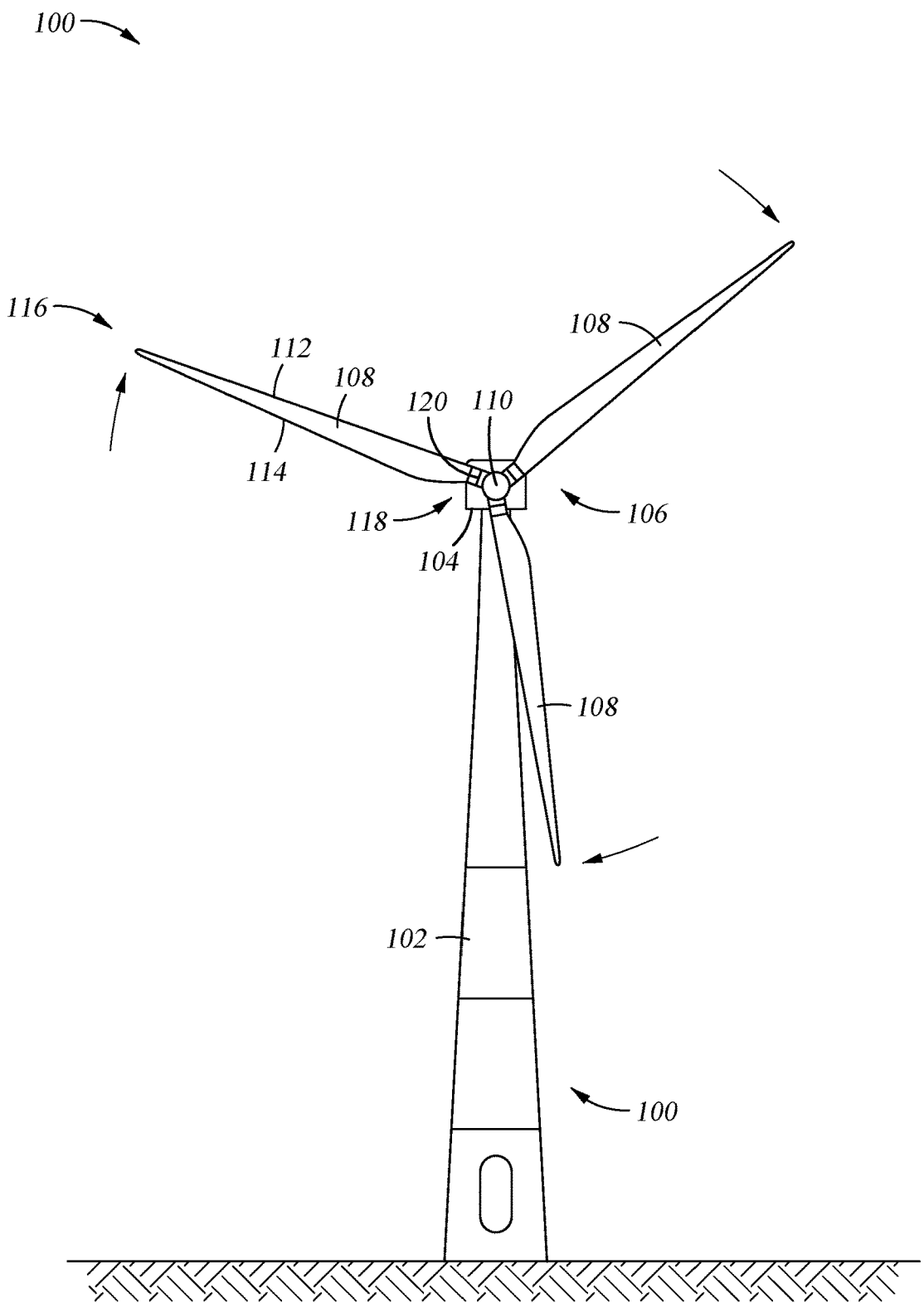
FIG. 1 illustrates a diagrammatic view of a horizontal-axis wind turbine, according to one embodiment.

FIG. 1 illustrates a diagrammatic view of a horizontal-axis wind turbine (or "wind turbine generator", "WTG") 100. The wind turbine 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner. For some embodiments, the blades 108 may be connected to the hub 110 using pitch bearings 120 such that each blade 108 may be rotated around its longitudinal axis to adjust the blade's pitch.

Figure 2:
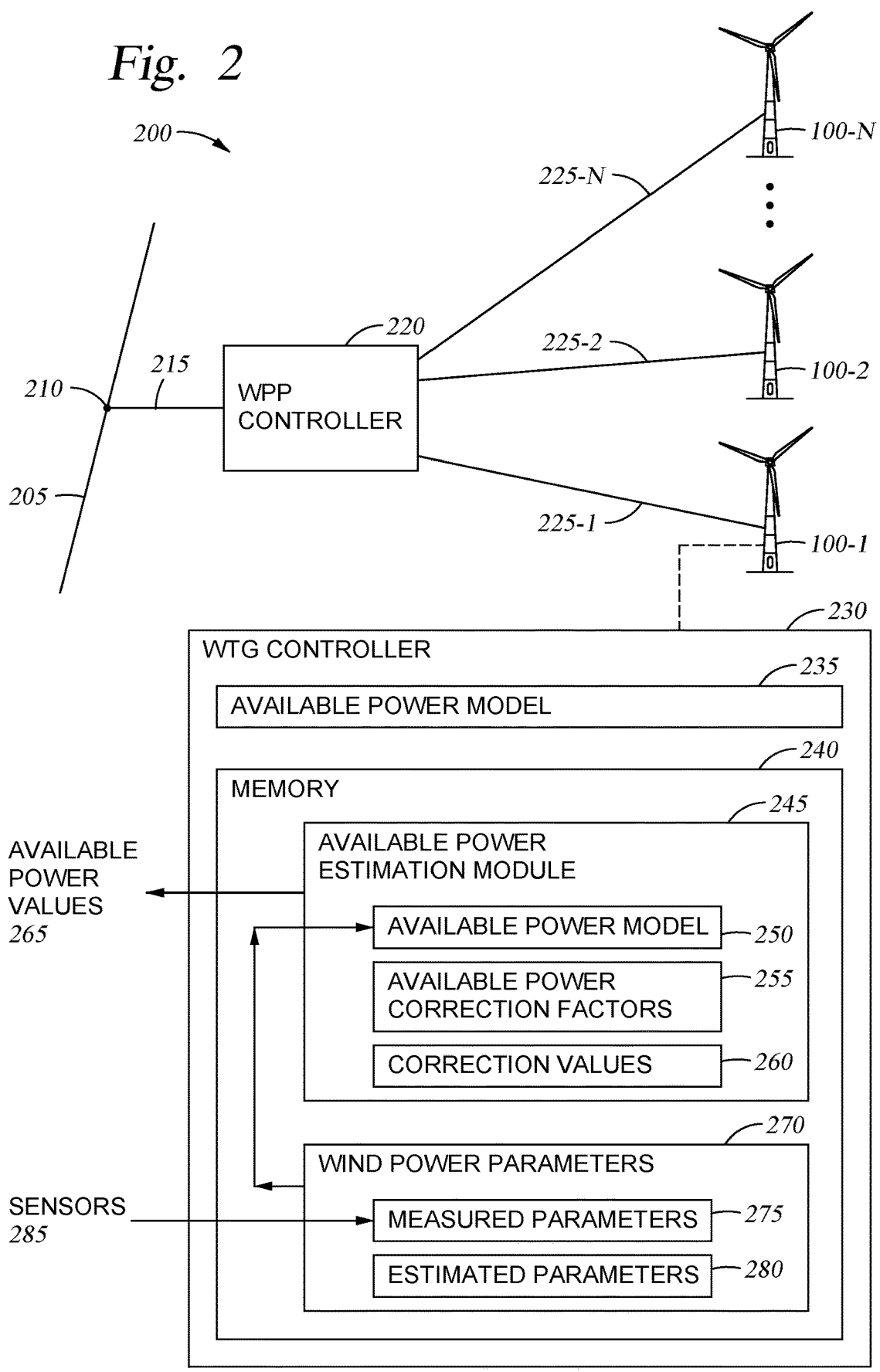
FIG. 2 illustrates a wind power plant operatively connected with an electrical grid, according to one embodiment.

FIG. 2 illustrates a wind power plant (or "WPP") 200 operatively connected with an electrical grid 205, according to one embodiment. In general, the WPP 200 may also be referred to as a "wind farm" or "wind park". The WPP 200 includes a plurality of WTGs 100 (i.e., wind turbines 100-1, 100-2, ..., 100-N) that are operatively connected with the electrical grid 205 at a point of common coupling (PCC) 210. The electrical grid 205 represents any suitable electrical transmission and/or distribution grids, which may be operated at one or more voltages. The electrical grid 205 is intended to be representative of a number of transmission lines, transformers, substations, power plants, etc.

Each WTG 100-1, 100-2, ..., 100-N includes an electrical generator (not shown) that is configured to convert the mechanical energy of the wind turbine rotor 106 into one or more phases of electrical power as respective power outputs 225-1, 225-2, ..., 225-N that ultimately may be delivered to the electrical grid 205 and to any loads connected therewith. The electrical generators may be of any suitable type, as would be known to a person skilled in the art.

The operation of the wind power plant 200 is controlled using a control arrangement, which includes a WPP controller 205 (also "power plant controller" or "PPC") that is communicatively coupled with one or more WTG controllers 230 using any suitable communication means, whether wire-based, wireless, optical, etc. In some embodiments, each WTG 100 is controlled by a separate WTG controller 230. In various embodiments, the WTGs 100-1, 100-2, ..., 100-N produce electrical power based on control signals provided by the WPP controller 205 and/or by the WTG controllers 230. The WTG controllers 230 may provide feedback signals and/or other information to the WPP controller 220 using the communicative connections.

The power output 215 is controlled by the WPP controller 220 and represents a collective power output that is delivered to the electrical grid 205 by the WPP 200. In one embodiment, the power output 215 is an aggregation of the various power outputs 225-1, 225-2, . . . , 225-N. In another embodiment the power output 215 can include, in addition to the power outputs 225-1, 225-2, . . . , 225-N, effects from signal conditioning and/or the operation of other power sources or loads controlled by the WPP controller 220, such as energy storage devices.

The WTG controller 230 comprises one or more processors 235 and a memory 240. The processors 235 may have any suitable form, such as a general purpose microprocessor, a controller, an application-specific integrated circuit (ASIC), and so forth. Memory 240 may include a variety of computer-readable media selected for their size, relative performance, or other capabilities: volatile and/or non-volatile media, removable and/or non-removable media, etc. Although not explicitly depicted, the WPP controller 220 may comprise one or more processors and/or a memory having properties similar to the processors 235 and the memory 240 of the WTG controller 230.

The memory 240 may include one or more modules for performing various functions described herein. The one or more modules generally include program code that is executable by one or more of the processors 235. However, the one or more modules may be implemented entirely in hardware, entirely in software (including firmware, resident software, micro-code, etc.), or in a combined implementation including software and hardware. As shown, the memory 240 comprises an available power estimation module 245. Additional functional modules are also described with respect to FIG. 3.

The available power estimation module 245 is configured to produce available power values 265, which represent the available power production of the corresponding WTG 100 when operated unconstrained in the current wind conditions. The available power values 265 may be communicated to the WPP controller 220. The WPP controller 220 may use the available power values 265 provided by the different WTGs 100-1, 100-2, . . . , 100-N to control the distribution of power production by the WPP 200.

The available power estimation module 245 comprises a predefined available power model 250 for determining estimated available power values based on one or more wind power parameters 270. The available power model 250 may be embodied in any suitable form, such as a look-up table having estimated available power values indexed according to the one or more wind power parameters 270 and/or the power production of the WTG 100. Another non-limiting example comprises a predefined function that receives values of the one or more wind power parameters 270.

The wind power parameters 270 may be acquired using one or more sensors 285 that are coupled with the WTG controller 230. The one or more sensors 285 may be of any suitable type(s), and may include anemometers, temperature sensors, air pressure sensors, humidity sensors, rotational speed sensors, pitch angle sensors, power sensors, and so forth. The measured parameters 275 may be directly sensed from the one or more sensors 285, and the estimated parameters 280 may be determined using one or more measured parameters 275. Some non-limiting examples of measured parameters 275 are wind speed measurements acquired from an anemometer, and air density measurements acquired using temperature data, air pressure data, and/or humidity data. Some non-limiting examples of estimated parameters 280 are estimated wind speed measurements derived from the wind speed measurements (e.g., a low-pass filtered wind speed measurement signal) and estimated air density measurements.

However, the available power production of each WTG 100 may depend on other factors that are not accounted for in the available power model 250, such that the estimated available power values produced using the available power model 250 are not accurate under all circumstances. The other factors may include wind-related factors and/or WTG-related factors. The wind-related factors may be reflected in the wind power parameters 270, but this is not a requirement. Some non-limiting examples of the wind-related factors are a wind share of the WTG 100, wind turbulence, and the air density. Some non-limiting examples of the WTG-related factors are blade conditions of the WTG 100 (such as dirt or ice on the blades, blade wear, blade misalignment, etc.) and an internal power consumption of the WTG 100.

In some embodiments, the available power model 250 may use knowledge about the fundamental parameters of the WTG 100, the expected aerodynamic efficiency (or "Cp table") of the WTG 100, the air density ($\rho$), and the wind speed (V). For example, in steady state (i.e., no rotor acceleration) the available power $P_{av}$ may be described according to the following equation:

$$P_{av}=\frac{1}{2}\times\rho\times A\times C_p\times V^3$$

where Cp is a function of pitch angle, rotational speed, and wind speed, and where A is the area swept by the rotor.

During constrained operation of the WTG 100 (for example, after receiving a derated reference signal from the WPP controller 220) the optimal pitch angle and optimal rotor speed are known corresponding to unconstrained operation of the WTG 100, as these parameters may be derived from a measurement or estimation of the wind speed. From the optimal rotor speed and optimal pitch angle, a Cp table look-up may be derived to determine values of the expected aerodynamic efficiency of the WTG 100 under different conditions. In some cases, the air density can be estimated from a temperature measurement and a height of the WTG 100 above sea level. Thus, the available power may be described as:

$$P_{av}=\frac{1}{2}\times\rho(T_a)\times A\times C_p(V)\times V^3$$

However, the available power model 250 may still have inaccuracies due to any of the following reasons:

1. Systematic Errors.

a. Inaccurate Cp table. The quality of the Cp table can be low, especially for constrained operation of the WTG 100 (e.g., during derated power production) for which the Cp table is not calibrated. For example, the Cp table may be generated to correspond to a particular wind speed (e.g., 9 meters per second (m/s)), and during derated operation of the WTG 100 a blade twist will change.

b. Ambient conditions. Factors such as wind share and wind turbulence affect the aerodynamic efficiency of the rotor. The Cp table is typically generated to correspond to some specific ambient conditions. If the actual ambient conditions are different, the available power estimate may be inaccurate.

c. Inaccurate measurements. For example, if the estimated air density or wind speed is incorrect, this can cause a systematic error for the available power estimate. Specifically, the (estimated) wind speed enters the equation to the third power, so an incorrect wind speed measurement has a large effect on the available power estimate. While actual wind speed measurements can be used instead of the estimated wind speed, the estimated wind speed tends to be more reliable.

2. Errors Developing Over Time.

Typically, the properties of the blades slowly change during the operational lifetime of the WIG 100. In one example, as the blades become dirty the aerodynamic efficiency will degrade. In another example, in cold climates ice may form on the blade and change the aerodynamic efficiency. Relative to the time resolution often required for an available power signal, each of these factors tend to change fairly slowly (e.g., in the range of hours for ice and in the range of months or years for dirt) and lead to a slowly degrading quality of the available power estimate. Further, dirty blades may cause the WIG 100 to have an ongoing degradation of its aerodynamic efficiency, while the ice-coated blades may cause the WIG 100 to have a more temporary degradation of its aerodynamic efficiency.

3. Controller-Induced Errors.

The controller may affect operation of the WIG 100 differently depending on the power production level. For instance, when operating around the rated wind speed the controller may impose a thrust limitation during full production. The level of thrust limitation may depend on the turbulence level of the wind. If the power is reduced from full production (i.e., constrained), the blade loads will be reduced and the thrust limitation may be removed by the controller. Thus, during derated operation, it may be difficult to accurately determine how the thrust limitation would affect the available power estimate had the WTG 100 been operating without the derating.

Figure 5A:
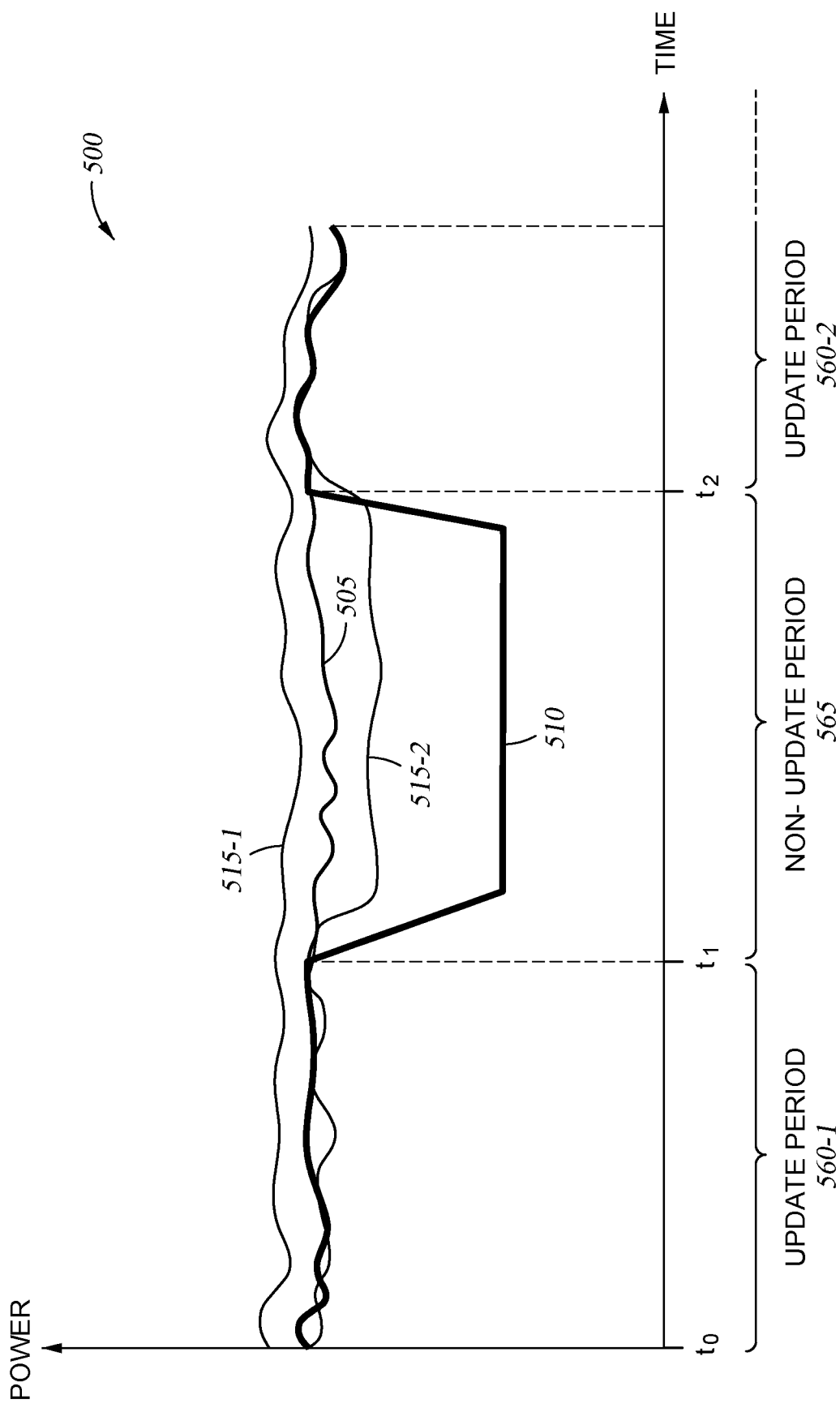
FIG. 5A is a graph illustrating faulty available power estimates, according to one embodiment.

Some examples of the effects of possible inaccuracies of the available power model 250 are illustrated in FIG. 5A.

In some embodiments, the available power estimation module 245 has one or more available power correction factors 255 (also described as available power correction factors F1, F2, ..., FJ) that are used to generate one or more correction values 260 (also described as correction values C1, C2, ..., CK) for the model-estimated available power values. The one or more available power correction factors 255 may be static factors or may be dynamically updated by the WTG controller 230. In some embodiments, the one or more available power correction factors 255 are updated during periods of unconstrained operation of the WTG 100, and are not updated during periods of constrained operation of the WTG 100 (e.g., a derated operation). The one or more correction values 260 are applied to the model-estimated available power values to produce the available power values 265. For example, the correction values 260 may be mathematically combined with the model-estimated available power values, such as added to or multiplied with the model-estimated available power values.

In some embodiments, the one or more correction values 260 are determined using the one or more available power correction factors 255. For example, the one or more correction values 260 may be a mathematical combination of multiple available power correction factors 255. In another example, the one or more one or more correction values 260 may be the same as the one or more available power correction factors 255.

The available power correction factors 255 and/or the one or more correction values 260 may be dependent on one or more wind power parameters 270. For example, controller-induced errors may depend significantly on the wind speed at the WTG 100. In some embodiments, the available power estimation module 245 maintains a plurality of correction values 260 that correspond to different values of the one or more wind power parameters 270. Each correction value 260 of the plurality of correction values 260 may correspond to particular values or ranges of the one or more wind power parameters 270.

In some embodiments, a particular correction value C1, C2, ..., CK may be applied based on the values of the one or more wind power parameters 270. For example, each correction value C1, C2, ..., CK may be applied during a respective wind speed interval: C1 is applied during wind speed values of 0.5 meters per second (m/s) to 1.5 m/s, C2 corresponds to 1.5 m/s to 2.5 m/s, C3 corresponds to 2.5 m/s to 3.5 m/s, and so forth. While this relatively simple example includes a corresponding 1 m/s interval for each correction value C1, C2, ..., CK, other embodiments may have different sized intervals and/or different interval sizes for different correction values C1, C2, ..., CK. For example, the interval sizes may be smaller (corresponding to a higher resolution of the correction values C1, C2, ..., CK) for expected operational ranges of a wind power parameter 270. Further, while described with respect to a single wind power parameter 270 (that is, wind speed), the correction values C1, C2, ..., CK may correspond to multiple wind power parameters 270.

In some embodiments, individual available power correction factors F1, F2, ..., FJ are dynamically updated based at least partly on the values of the one or more wind power parameters 270. For example, each available power correction factor F1, F2, ..., FJ may be updated within a respective wind speed interval, which in some cases can correspond to the wind speed intervals that are used for applying the correction values C1, C2, ..., CK. In some embodiments, each available power correction factor F1, F2, ..., FJ may be dynamically updated only during periods in which the wind speed is within the corresponding wind speed interval. Further, the dynamic updating of the available power correction factors F1, F2, ..., FJ may be enabled or disabled based on one or more other wind power parameters 270 and/or based on the power production of the WTG 100. For example, a particular available power correction factor F2 may be updated only during periods in which: (1) the wind speed is within the wind speed interval corresponding to the available power correction factor F2, (2) the WIG 100 is operating with unconstrained power production, and (3) the wind turbulence is less than a predefined value. Other combinations of conditions for dynamically updating the available power correction factors F1, F2, ..., FJ are also possible.

The dynamic updating of one or more available power correction factors F1, F2, ..., FJ may cause the calculations for one or more correction values C1, C2, ..., CK to also be updated. Thus, in some embodiments, the one or more correction values C1, C2, ..., CK are dynamically updated based at least partly on the values of the one or more wind power parameters 270.

The dynamic updating of the available power correction factors F1, F2, ..., FJ and/or the one or more correction values C1, C2, ..., CK may be based further on difference values (or error values) that represent determined differences between the power production level of the WTG 100 and the model-estimated available power values. In some embodiments, the available power estimation module 245 applies a low-pass filter to the difference values, which may have a relatively long time constant. For example, the low-pass filter may have a time constant of about 30 minutes or more, although other values are also possible. In some embodiments, the difference values may be most reliably determined during periods of unconstrained operation of the WTG 100, as the available power values 265 should be substantially equal to the actual (and measurable) power production levels of the WTG 100.

Although discussed primarily with respect to unconstrained operation of the WTG 100, the dynamic updating of the available power correction factors F1, F2, ..., FJ and/or the one or more correction values C1, C2, ..., CK may be additionally or alternately performed during periods of constrained operation of the WTG 100. In such cases, the available power estimation module 245 may enable dynamic updating when the particular constraint(s) that have been placed on power production correspond to a suitably predictable effect on the model-estimated available power values. Conversely, the available power estimation module 245 may disable dynamic updating when any imposed constraint on power production has an unpredictable effect on the model-estimated available power values. For example, dynamic updating may be disabled during severe weather conditions. In some embodiments, the severe weather conditions may be determined using an oscillation level measured at the top of the wind turbine tower and/or using an oscillation level of the loading of the wind turbine blades. In one example, standard deviation values for the oscillation level(s) may be used to determine the presence or absence of severe weather conditions. In another example, root-mean-square (RMS) values of the oscillation level(s) may be used to determine the presence or absence of severe weather conditions.

Other techniques for updating the available power correction factors F1, F2, ..., FJ and/or updating and applying the one or more correction values C1, C2, ..., CK may also be used. In one embodiment, the available power estimation module 245 performs a polynomial regression operation to determine the correction values C1, C2, ..., CK. Further, the available power estimation module 245 may use an individual difference value to update some or all of the available power correction factors F1, F2, ..., FJ and/or some or all of the one or more correction values C1, C2, ..., CK. In such cases, the amount of updating to different available power correction factors F1, F2, ..., FJ and/or correction values C1, C2, ..., CK may be weighted, e.g., according to the wind speed. For example, if the wind speed is 7.8 m/s, the difference value may be used with a weighting factor 0.5 to update a correction value C7 (corresponding to a wind speed interval of 6.5 m/s to 7.5 m/s) and with a weighting factor 0.8 to update a correction factor C8 (corresponding to a wind speed interval of 7.5 m/s to 8.5 m/s). Similarly, when determining a correction value, in some embodiments the available power estimation module 245 performs a linear interpolation of multiple correction values C1, C2, ..., CK, e.g., based on the wind speed. For example, if the wind speed is 7.8 m/s, the correction value may be calculated according to $C=(0.2 \times C7)+(0.8 \times C8)$. Other techniques are also possible for dynamic updating.

Figure 3:
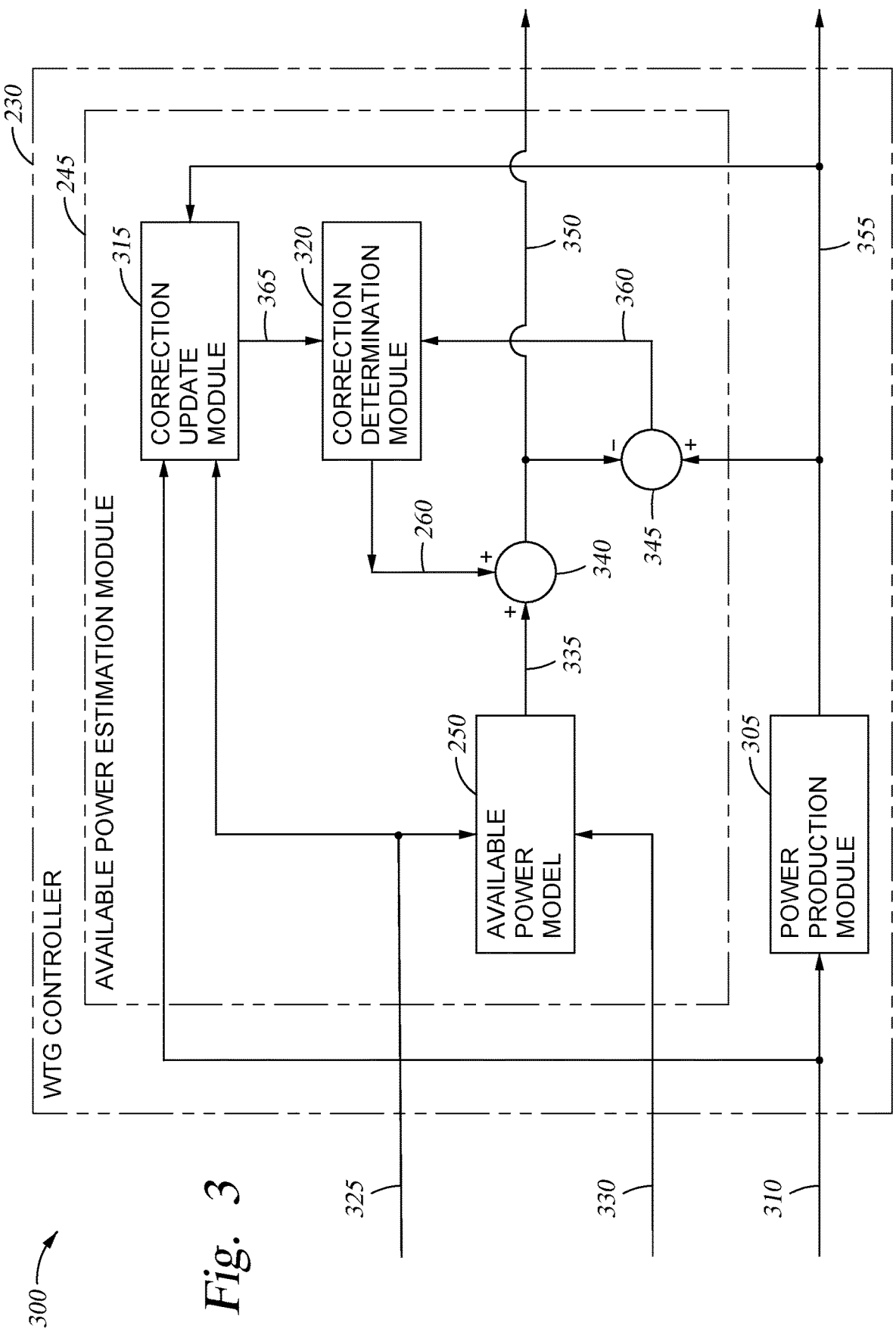
FIG. 3 is a diagram illustrating a wind turbine controller for determining an available power value, according to one embodiment.

FIG. 3 is a diagram 300 illustrating a WTG controller 230 for determining an available power value, according to one embodiment. The wind turbine controller 230 may be used in conjunction with other embodiments disclosed herein.

As shown, the WTG controller 230 comprises a power production module 305 and the available power estimation module 245. The power production module 305 is configured to control power production of the associated WTG 100. For example, the power production module 305 may be configured to receive demand signals indicating a requested power production, and generate control signals for the generator and/or converter of the WTG 100 to meet the requested power production. The power production module 305 may acquire sensor measurements, e.g., to determine the power production level 355 of the WTG 100, and may further adapt the control signals based on the sensor measurements or parameters derived therefrom.

The available power estimation module 245 comprises a predefined available power model 250 that is configured to generate an estimated available power value 335 using an estimated wind speed 325 and an estimated air density 330. In other embodiments, the estimated available power value 335 may be based on different combinations of wind power parameters. The (model-)estimated available power value 335 is added with a correction value 260 in a summer 340 to produce the available power value 350. In some cases, the available power value 350 may be output from the WTG controller 230, e.g., communicated to a WPP controller.

The available power value 350 is subtracted from the power production level 355 in a summer 345 to produce the difference signal 360. The difference signal 360 is provided to the correction determination module 320, which is configured to determine and update the one or more correction values 260 using the difference signal 360. Although not shown here, the correction determination module 320 may be further configured to update one or more available power correction factors, which may affect the updating of the one or more correction values 260.

The correction update module 315 is configured to control whether or not the correction determination module 320 will dynamically update the correction values 260. In some embodiments, the correction update module 315 may be configured to enable dynamic updating of the correction values 260 upon determining that the power production level 355 of the WTG is substantially equal to the available power under the particular wind conditions.

In some embodiments, the correction update module 315 produces an enable signal 365 using the estimated wind speed 325, the power production level 355, and a derate reference 310. For example, the enable signal 365 may have a logical "high" value (enabling dynamic updating of the correction determination module 320) when the derate reference 310 has a logical "low" value (suggesting an unconstrained operation of the WTG 100), the power production level 355 indicates that the WTG 100 is producing power, and the estimated wind speed 325 is within a desired range. However, the enable signal 365 may have a logical "low" value (disabling dynamic updating) when the derate reference 310 has a logical "high" value, the power production level 355 indicates that the WTG is not producing power, or the estimated wind speed 325 is outside the desired range.

Other factors or combinations of factors may be used by the correction update module 315 when determining values of the enable signal 365. In one example, when the WTG controller 230 has "paused" power production, the enable signal 365 has a logical "low" value such that dynamic updating is disabled. In another example, one or more other constraints imposed by the WTG controller 230 may cause the enable signal 365 to have a logical "low" value, such as operating in a predefined load or noise-reduced mode that has a reduced rotational speed set point and/or reduced power production set point, or operating in a mode in which a minimum collective pitch angle for the wind turbines is increased. In another example, one or more wind conditions may cause the enable signal 365 to have a logical "low" value, such as a wind turbulence intensity, wind shear, or a yaw error exceeding a predefined value. Generally, the one or more wind conditions may relate to imbalances in blade loading, such that detected imbalances may be used by the correction update module 315 to determine the enable signal 365.

Figure 4:
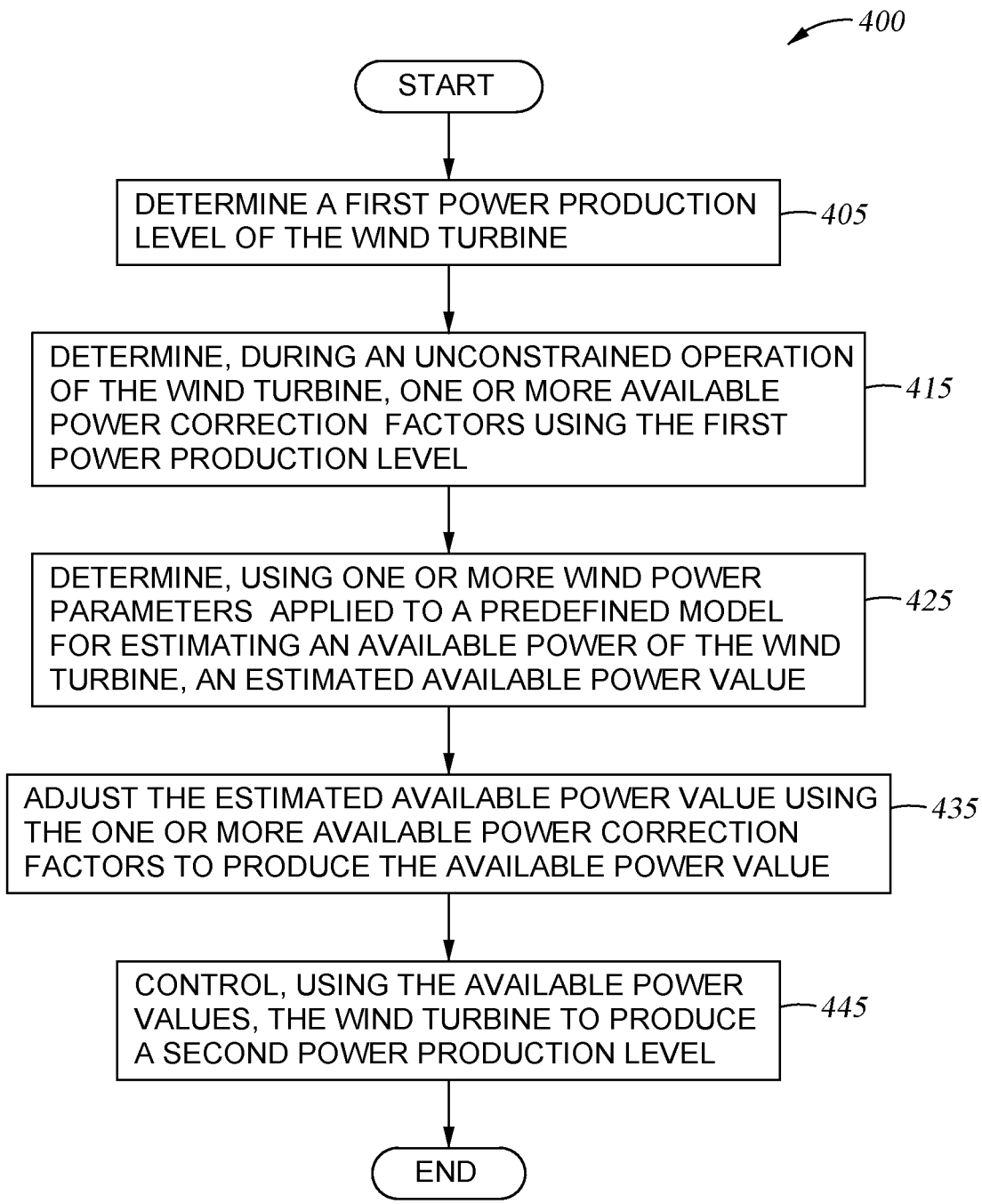
FIG. 4 illustrates a method for operating a wind turbine, according to one embodiment.

FIG. 4 illustrates a method 400 for operating a wind turbine, according to one embodiment. The method 400 may be used in conjunction with other embodiments described herein, and may be performed using a controller such as the WTG controller 230 of FIGS. 2 and 3.

Method 400 begins at block 405, where the controller determines a first power production level of the wind turbine. In some embodiments, the controller is coupled with one or more sensors and determines the first power production level based on sensor measurements.

At block 415, during an unconstrained operation of the wind turbine, the controller determines one or more available power correction factors using the first power production level. In some embodiments, determining one or more available power correction factors comprises determining a difference between an estimated available power value provided by a predefined model, and the first power production level of the wind turbine. In some embodiments, determining one or more available power correction factors comprises updating the one or more available power correction factors substantially continuously during periods of unconstrained operation of the wind turbine, and not updating the one or more available power correction factors during periods of constrained operation.

Alternatively, the one or more available power correction factors may be determined during constrained operation of the wind turbine, where the controller determines that particular constraint(s) that have been placed on power production correspond to a suitably predictable effect on model-estimated available power values.

At block 425, the controller determines an estimated available power value using one or more wind power parameters applied to a predefined model for estimating an available power of the wind turbine. In one embodiment, the one or more wind power parameters applied to the predefined model include one or more of: an actual wind speed, an estimated wind speed, an actual air density, and an estimated air density.

At block 435, the controller adjusts the estimated available power value using the one or more available power correction factors to produce the available power value. In some embodiments, adjusting the estimated available power value comprises determining a first correction value using at least a first correction factor of the one or more available power correction factors, and applying the first correction value to the estimated available power value to produce the available power value.

At block 445, the controller controls, using the available power value, the wind turbine to produce a second power production level. In some embodiments, the controller is configured to transmit control signals to the generator of the wind turbine to produce the second power production level. Method 400 ends following completion of block 445.

FIG. 5A is a graph 500 that illustrates a plot 505 of available power for an exemplary wind turbine, a plot 510 of power production of the wind turbine, and plots 515-1, 515-2 of estimated available power under different conditions of the wind turbine. From time $t_0$ to time $t_1$, the wind turbine is operating unconstrained, and the power production (plot 510) and the available power (plot 505) are substantially equal. At time $t_1$, the wind turbine receives a derate reference signal causing the wind turbine to have constrained operation. Between times $t_1$ and $t_2$, the power production of the wind turbine is reduced to less than the available power. At time $t_2$, the wind turbine resumes unconstrained operation and the power production again substantially equals the available power.

Plot 515-1 illustrates a case in which the estimated available power of the wind turbine is overestimated. The overestimated may be caused, for example, by inaccuracies in the expected aerodynamic efficiency (or Cp table) for the wind turbine, a controller-imposed constraint such as variable thrust limiting, or by ice forming on the blades of the wind turbine.

Plot 515-2 illustrates a case in which the estimated available power is relatively accurate during periods of unconstrained operation, but becomes inaccurate during constrained operation. For example, the expected aerodynamic efficiency of the wind turbine may be relatively accurate, but changes in the measured or estimated wind speed caused by, e.g., derating the wind turbine between times $t_1$ and $t_2$ causes the estimated available power to decrease. Stated another way, although the free wind speed would not change due to derating the wind turbine, the derating may cause the wind turbine to operate at a different operating point, e.g., by pitching out the blades. The different operating point may correspond to a new balance between the power intake at the rotor and the power output by the wind turbine. The new operating point might not yield the same results in terms of estimated or measured wind speed. For example, in the case of estimated wind speed, the estimation may be based on another, less accurate portion of the $C_P$ table. In the case of measured wind speed, the calibration may no longer be accurate due to the different rotation of the wind field.

Figure 5B:
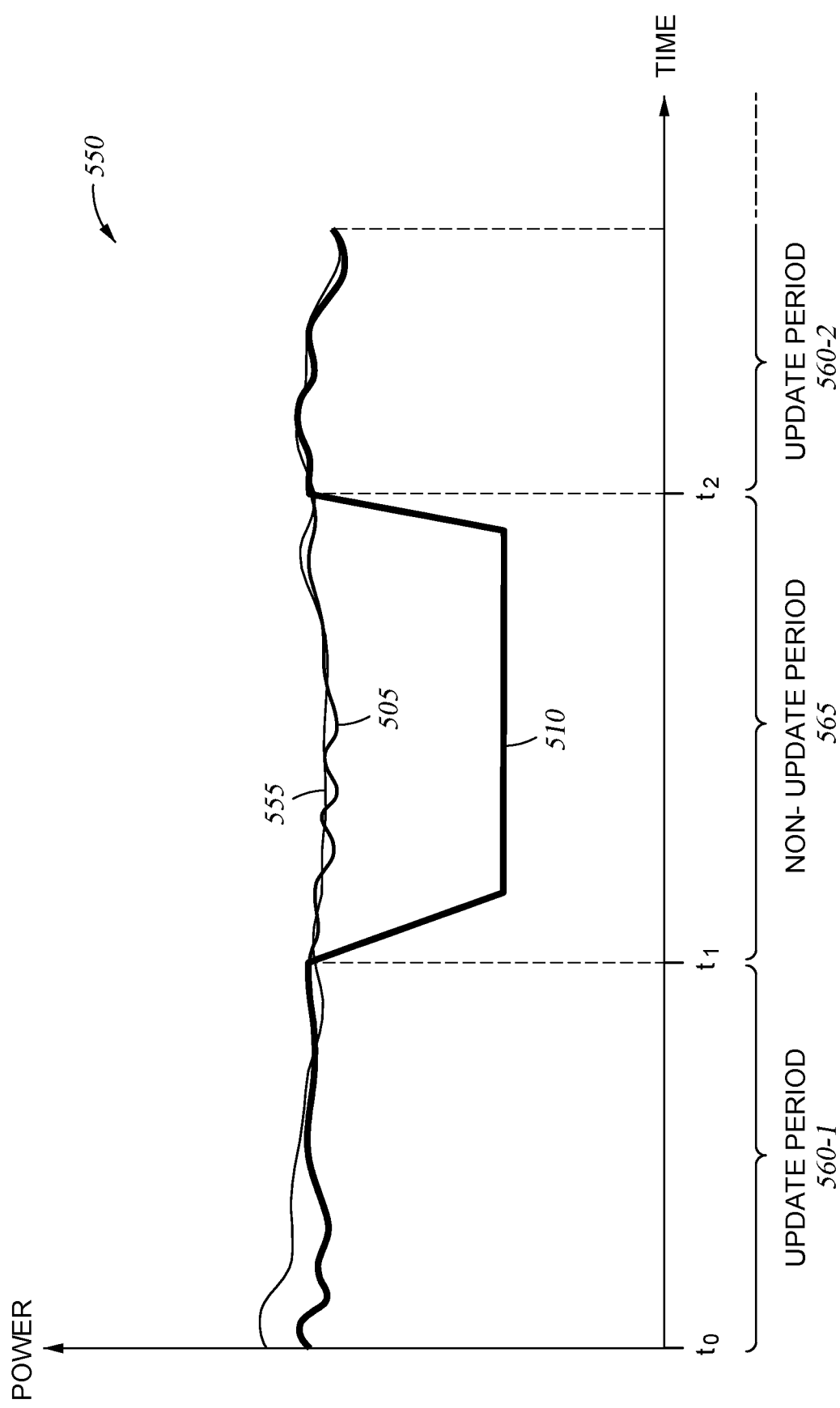
FIG. 5B is a graph illustrating adaptively estimated available power values, according to one embodiment.

FIG. 5B is a graph 550 that illustrates adaptively estimated available power values for the exemplary wind turbine, according to one embodiment. At time $t_0$, plot 555 of the estimated available power of the wind turbine differs from the power production (plot 510). For example, the difference may be caused by an inaccuracy in the expected aerodynamic efficiency for the wind turbine. In some embodiments, the correction values are dynamically updated and applied during update period 560-1 (between times $t_0$ and $t_1$) when the available power and the power production are substantially equal (corresponding to unconstrained operation). As a result, plot 555 of the estimated available power converges toward plots 505, 510 during the update period 560-1, indicating a reduction of the difference between the estimated available power and the actual available power 505.

The derated operation of the wind turbine between times $t_1$ and $t_2$ corresponds to a non-update period 565 in which the correction values are not updated (or "frozen"). As shown, the estimated available power (plot 555) more closely estimates the available power (plot 505) during the non-update period 565 due to the previously updated correction values. When unconstrained operation of the wind turbine resumes at time $t_2$, the correction values are dynamically updated and applied during update period 560-2.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method for operating a wind turbine, the method comprising:
    determining, using one or more sensors of the wind turbine, a first power production level of the wind turbine;
    determining, during an unconstrained operation of the wind turbine, one or more available power correction values based on the first power production level;
    determining, during a constrained operation of the wind turbine, an estimated available power value using one or more wind power parameters applied to a predefined model for estimating an available power of the wind turbine, wherein the constrained operation comprises a derated operation of the wind turbine;
    adjusting, during the constrained operation, the estimated available power value using the one or more available power correction values to produce an available power value indicating the available power of the wind turbine; and
    controlling, during the constrained operation and using the available power value, the wind turbine to produce a second power production level.

2. The method of claim 1, wherein adjusting the estimated available power value using the one or more available power correction values comprises:
    determining a first available power correction value; and
    applying the first available power correction value to the estimated available power value to produce the available power value.

3. The method of claim 1, wherein determining the one or more available power correction values comprises:
    determining a difference between the estimated available power value and the first power production level of the wind turbine.

4. The method of claim 3, wherein determining the one or more available power correction values is performed by applying a low-pass filter to the difference, and
    wherein a time constant of the low-pass filter is about 30 minutes or more.

5. The method of claim 1, wherein the one or more wind power parameters that are applied to the predefined model include one or more of: an actual wind speed, an estimated wind speed, an actual air density, and an estimated air density.

6. The method of claim 1, wherein determining the one or more available power correction values comprises:
    updating the one or more available power correction values during periods of the unconstrained operation of the wind turbine, and
    wherein the one or more available power correction values are not updated during periods of constrained operation of the wind turbine.

7. The method of claim 1, wherein determining the one or more available power correction values comprises determining a plurality of available power correction values, and
    wherein each available power correction value of the plurality of available power correction values corresponds to a respective wind speed interval of a plurality of wind speed intervals.

8. The method of claim 7, wherein determining the plurality of available power correction values comprises:
    updating at least a first available power correction value of the plurality of available power correction values when a determined wind speed is within a first wind speed interval of the plurality of wind speed intervals that corresponds to the first available power correction value.

9. The method of claim 7, further comprising:
determining a first available power correction value by interpolating multiple available power correction values of the available power correction values,
wherein adjusting the estimated available power value comprises:
applying the first available power correction value to the estimated available power value to produce the available power value.

10. A wind turbine comprising:
a generator configured to produce electrical power;
one or more sensors; and
a control arrangement comprising one or more computer processors that are communicatively coupled with the generator, the control arrangement configured to:
determine, using the one or more sensors, a first power production level of the generator;
determine, during an unconstrained operation of the wind turbine, one or more available power correction values based on the first power production level;
determine, during a constrained operation of the wind turbine, an estimated available power value using one or more wind power parameters applied to a predefined model for estimating an available power of the generator, wherein the constrained operation comprises a derated operation of the wind turbine;
adjust, during the constrained operation, the estimated available power value using the one or more available power correction values to produce an available power value indicating the available power of the wind turbine; and
transmit, during the constrained operation and using the available power value, control signals to the generator such that the generator produces a second power production level.

11. The wind turbine of claim 10, wherein adjusting the estimated available power value using the one or more available power correction values comprises:
determining a first available power correction value; and
applying the first available power correction value to the estimated available power value to produce the available power value.

12. The wind turbine of claim 10, wherein determining the one or more available power correction values comprises:
determining a difference between the estimated available power value and the first power production level of the wind turbine.

13. The wind turbine of claim 10, wherein the one or more wind power parameters that are applied to the predefined model include one or more of: an actual wind speed, an estimated wind speed, an actual air density, and an estimated air density.

14. The wind turbine of claim 10, wherein determining the one or more available power correction values comprises:
updating the one or more available power correction values factors substantially during periods of the unconstrained operation of the wind turbine, and
wherein the one or more available power correction values are not updated during periods of constrained operation of the wind turbine.

15. The wind turbine of claim 10, wherein determining the one or more available power correction values comprises determining a plurality of available power correction values, and
wherein each available power correction value factor of the plurality of available power correction values factors corresponds to a respective wind speed interval of a plurality of wind speed intervals.

16. A control arrangement for a wind turbine, the control arrangement comprising one or more computer processors that are configured to:
measure, using one or more sensors of the wind turbine, a first power production level of the wind turbine;
determine, during an unconstrained operation of the wind turbine, one or more available power correction values based on the measured first power production level;
determine, during a constrained operation of the wind turbine, an estimated available power value using one or more wind power parameters applied to a predefined model for estimating an available power of the wind turbine, wherein the constrained operation comprises a derated operation of the wind turbine;
adjust, during the constrained operation, the estimated available power value using the one or more available power correction values to produce an available power value indicating the available power of the wind turbine; and
control, during the constrained operation and using the available power value, the wind turbine to produce a second power production level.

17. The control arrangement of claim 16, wherein adjusting the estimated available power value using the one or more available power correction values comprises:
determining a first available power correction value; and
applying the first available power correction value to the estimated available power value to produce the available power value.

18. The control arrangement of claim 16, wherein determining the one or more available power correction values comprises:
determining a difference between the estimated available power value and the measured first power production level of the wind turbine.

19. The control arrangement of claim 16, wherein the one or more wind power parameters that are applied to the predefined model include one or more of: an actual wind speed, an estimated wind speed, an actual air density, and an estimated air density.

20. The control arrangement of claim 16, wherein determining the one or more available power correction values comprises:
updating the one or more available power correction values during periods of the unconstrained operation of the wind turbine, and
wherein the one or more available power correction values are not updated during periods of constrained operation of the wind turbine.

* * * * *